United States Patent [19]

Bergman

[11] 4,167,147

[45] Sep. 11, 1979

[54] METHOD AND APPARATUS FOR STABILIZING A FLOATING STRUCTURE

[75] Inventor: Gunnar B. Bergman, Laguna Beach, Calif.

[73] Assignee: SeaTek Corp., Goleta, Calif.

[21] Appl. No.: 873,700

[22] Filed: Jan. 30, 1978

Related U.S. Application Data

[63] Continuation of Ser. No. 649,997, Jan. 19, 1976, abandoned.

[51] Int. Cl.² .............................................. B63B 43/14
[52] U.S. Cl. ..................................... 114/122; 114/265
[58] Field of Search ............... 114/121, 122, 125, 264, 114/265; 254/172; 61/86

[56] References Cited

U.S. PATENT DOCUMENTS

| | | | |
|---|---|---|---|
| 2,889,795 | 6/1959 | Parks | 114/125 |
| 3,349,740 | 10/1967 | Field | 114/122 |
| 3,537,412 | 11/1970 | Henderson | 114/125 |
| 3,580,207 | 5/1971 | Pangalila | 114/265 |
| 3,654,886 | 4/1972 | Silverman | 114/122 |
| 3,804,183 | 4/1974 | Duncan et al. | 254/172 |
| 3,886,886 | 6/1975 | Anders | 114/125 |
| 3,957,010 | 5/1976 | Soulant, Jr. | 114/264 |

*Primary Examiner*—Jesus D. Sotelo
*Attorney, Agent, or Firm*—Albert C. Smith

[57] ABSTRACT

A floating semi-submersible platform is heave stabilized by velocity damping of platform motion. Vertical velocity of the platform is sensed and a force is applied to the platform as a function of and in opposition to the sensed heave velocity. The system may be passive, as by provision of velocity damping in tethering cables. It may be actively hydrostatic by employing variable ballast tanks and water pumps or air pressure for displacement of water, or it may be actively hydrodynamic by employing propellers or rotor blades for thrust generation. By applying a heave opposing force that is proportional to heave velocity, the platform response to waves at the platform resonant period is greatly reduced with exertion of relatively small magnitude opposing forces, whereby the platform may be designed with a considerably smaller resonant period for a given set of expected conditions.

16 Claims, 15 Drawing Figures

METHOD AND APPARATUS FOR STABILIZING A FLOATING STRUCTURE

CROSS REFERENCE TO RELATED APPLICATION

This is a continuation of application Ser. No. 649,997, filed Jan. 19, 1976, now abandoned.

BACKGROUND OF THE INVENTION

The present invention relates to floating structures and more particularly concerns methods and apparatus for improving stabilization of such structures.

In various types of operations, such as scientific surveys, oil and gas well drilling and production, floating platforms are required because of water depths and other conditions, both physical and economic. For such floating platforms, maximum stability is required. The platform should move as little as possible in response to the forces exerted by waves. The use of a conventional ship type hull is hardly satisfactory because of excessive motion of this type of structure in response to sea motion. A type of platform commonly called a semi-submersible platform has been developed to provide for maximum stability in the presence of rough water and weather conditions. A semi-submersible platform typically comprises a number of submerged hulls and an elevated superstructure. A number of vertical columns support the superstructure from the submerged hulls. With the platform at rest in still water, the weight of the platform is exactly balanced by the hydrostatic buoyancy force acting on the submerged part of the platform. Accordingly, the platform will normally float with the hull and lower portions of the vertical columns submerged and the deck floating clear of the water.

Nevertheless, even the semi-submersible platform moves with water motion. Heave in particular is a problem in rough water areas. The platform, of course, is subject to other motions, such as roll and pitch, roll being an angular displacement about a longitudinal axis, pitch being an angular displacement about a transverse axis and heave being vertical linear displacement of the platform.

Resonant motion occurs when the natural periods of the various motion components, heave, roll and pitch, are substantially equal to the periods of the disturbing forces which cause such heave, roll and pitch. For avoidance of resonant motion a semi-submersible platform is superior to a surface vessel, particularly because its natural resonant period may be more readily controlled in design of the platform. In analysis of the heaving characteristics of the semi-submersible, one may consider the vertical force exerted by the water as the sum of forces acting upwards on the bottom of the vertical columns and those acting upwards on the submerged hull structure, which is often in the form of horizontally extending pontoons interconnecting the lower ends of the vertical columns.

Operational draft of such a platform is substantial, in the order of 50 to 70 feet, which causes oscillatory heaving forces that act on column bottoms and pontoons to be relatively small since pressure fluctuations decrease with depth. Further, it is possible to choose the dimensions of the vertical columns and the pontoons or submerged hull so that at some predetermined wave period the resultant vertical force upon the platform approaches zero, leaving only small residual drag forces. Thus, it is common in design of semi-submersible platforms to employ a relative large displacement in the submerged hull and to employ relatively small displacement in the vertical columns. This will increase the resonant period of platform heave so that it is longer than the longest period of naturally occurring waves that may be reasonably expected in a particular area. If the resonant period of the platform is caused to be about eighteen seconds, heave resonance effects are eliminated for seas of any size having a wave period smaller than about sixteen seconds.

Major efforts in platform design are directed toward avoidance of resonance because of the severe adverse effects of resonance. Motions of the platform in response to seas having a period equal to the resonant period of the platform are greatly increased. Thus heave displacement at resonance may be several times greater than the maximum heave displacement, for comparable wave height, at other, non-resonant wave periods.

However, design considerations leading to an increased resonant period result in platforms that are more costly, larger and in some respects less stable. This problem is recognized by the patentees Schuler et al in U.S. Pat. No. 3,391,666, who suggest a solution which entails varying stability of the platform by a variation in the water plane area (and thus the inertia of the platform column). This is said to be achieved in the Schuler patent by employing hollow columns that may be flooded with sea water or charged with air thus effectively varying the water plane area of the individual columns. This is an expensive and complex solution and yet may not effectively control platform motion.

Many other types of structures have been employed for controlling stability and minimizing motion of floating platforms including hydrodynamic structures such as shown in U.S. Pat. Nos. 3,318,275, 3,349,740, 2,190,617, passive or active hydrostatic structures such as shown in U.S. Pat. Nos. 3,159,130, 3,083,671, 3,160,135, 3,537,412, 3,207,110, 2,889,795 and also arrangements that are anchored or tethered to the bottom, such as shown in U.S. Pat. Nos. 2,972,973, 3,654,886, 3,702,105 and 3,566,608. However, these systems all fail to effectively handle the problem of excessive amplitude of platform displacement in the presence of waves of a period substantially equal to the natural resonant period of the platform. Thus it is still necessary to design the platform so that its natural resonant period is above the longest wave period to be expected. Further, many of these systems require arrangements of tanks and interconnecting conduits which themselves are resonant at certain frequencies and these will operate optimally solely at a preselected wave period.

Because of the size of the semi-submersible platforms, the disturbing forces exerted by the water are large and thus forces needed to counteract such disturbing forces may be excessive. Dynamic systems employing principles of prior art arrangements may economically exert forces of a magnitude such as to have too little effect at resonance. In other words, it is more feasible according to prior arrangements to avoid resonance rather than to counteract resonant amplitudes.

Accordingly, it is an object of the present invention to provide motion stabilization of a floating structure which avoids or minimizes problems described above.

SUMMARY OF THE INVENTION

In carrying out principles of the present invention in accordance with a preferred embodiment thereof, platform oscillatory displacement is velocity damped by applying an anti-heave force that is a function of heave velocity of the platform. The floating platform has a natural resonant period and is subject to oscillatory displacement in response to oscillatory motion of the water in which the platform is floated. Means are provided for applying to the platform a force tending to decrease platform displacement, the force being a function of the rate of change of platform displacement (i.e., velocity), whereby displacement magnitude is greatly decreased by application of relatively small damping forces when the wave period is substantially equal to the natural resonant period of the platform.

DESCRIPTION OF THE PREFERRED EMBODIMENT

Many different types of semi-submersible structures are known and presently employed, and principles of the present invention are applicable to many of these and also to floating structures of other types. However, for purposes of exposition, the invention will be explained in connection with a semi-submersible platform of the type illustrated in FIG. 1. The platform includes a deck 10 supported on four tubular hollow columns 12, 14, 16 and 18. Columns 12 and 14 are interconnected adjacent their lower ends by a generally horizontally extending pontoon 20 having end portions 22, 24 that extend beyond the respective columns 12 and 14. Similarly, columns 16 and 18 are interconnected adjacent their lower ends by a generally horizontally extending pontoon 26 having end portions 28 and 30 extending outwardly beyond the ends of the columns. This exemplary platform has cylindrical columns each 40 feet in diameter and arranged in a square arrangement with a center to center distance between columns of 200 feet. Pontoon diameters are 31.6 feet and the length of each pontoon is 400 feet. Draft of this arrangement is 70 feet with a platform displacement of approximately 23,000 metric tons. The described platform has a natural period of heave that is calculated to be 18.3 seconds and is determined experimentally to be 18.0 seconds. The sizes and arrangement of deck columns and pontoons may be varied to provide many known arrangements.

Figure 1:
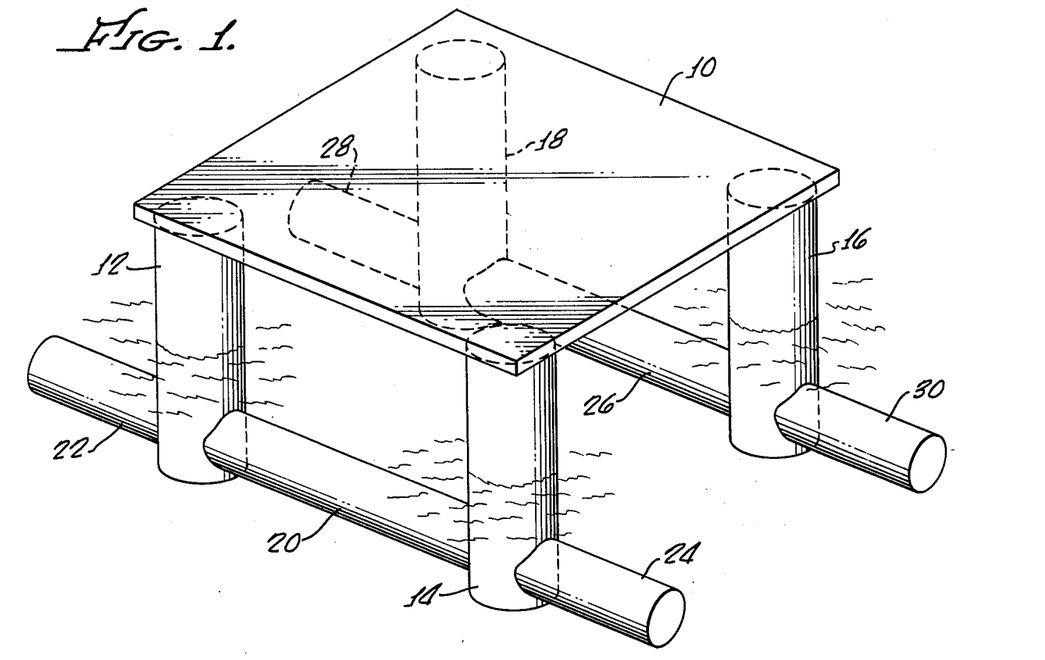
FIG. 1 illustrates an exemplary semi-submersible platform with which the present invention may be employed.

Heave response, that is, the vertical component of platform motion in the presence of disturbing waves, is formed of two basic components in a platform of the type illustrated in FIG. 1. This response is depicted in the graph in FIG. 2 which plots heave force amplitude vertically against wave period in seconds horizontally. The component of heave force exerted on a platform by the columns is depicted by a substantially horizontal line indicated at 32, showing that the force exerted by the column does not vary with wave period. Forces exerted by the pontoons, as shown by curve 34, do vary with wave period from a relatively large magnitude at shorter wave periods to decreasing magnitudes at increased periods. It will be understood that the forces exerted by the columns and pontoons are mutually opposed (although both are shown above the horizontal axis in FIG. 2 for ease of illustration) and, therefore, at some wave period, a point 36 indicated at 15 seconds in FIG. 1, the two opposing forces are equal and will substantially cancel each other.

Figure 2:
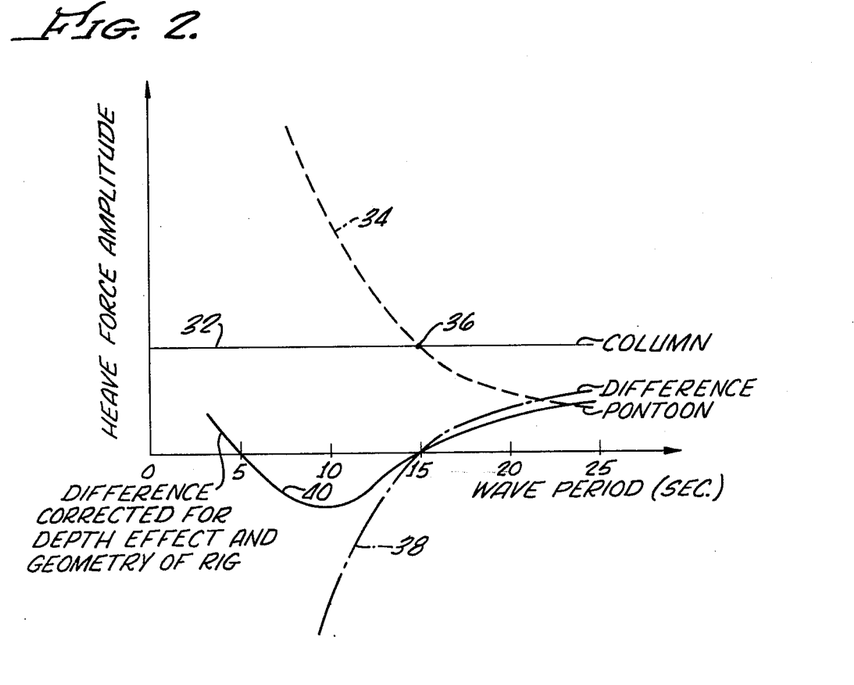
FIG. 2 is a graph illustrating heave forces on a semi-submersible platform for various wave periods.

The net force acting on the semi-submersible structure is the difference between the forces indicated by curves 32 and 34 and theoretically would follow the shape of the difference curve 38. However, because of a depth effect (the pontoons are submerged far below the surface), the effect of the geometry of the platform structure (a single wave may have different effects upon different columns of the same structure and upon different parts of the pontoons) the difference curve 38 must be corrected to provide an actual difference curve as indicated at 40.

Figure 3:
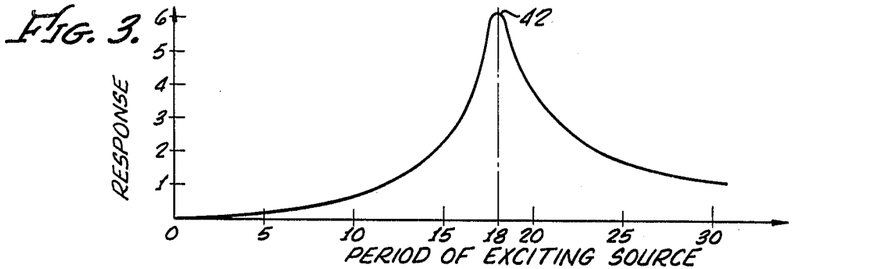
FIG. 3 illustrates a typical response curve of a spring mass system.

FIG. 3 illustrates the response of a spring mass system, plotting motion amplitude vertically against period of the exciting force horizontally. As is well known, such a system has a peak 42 at the system resonant period, here assumed to be 18 seconds, and response of the system to the exciting force drops off on either side of the resonant peak at a rate depending upon the "Q" of the system.

Figure 4:
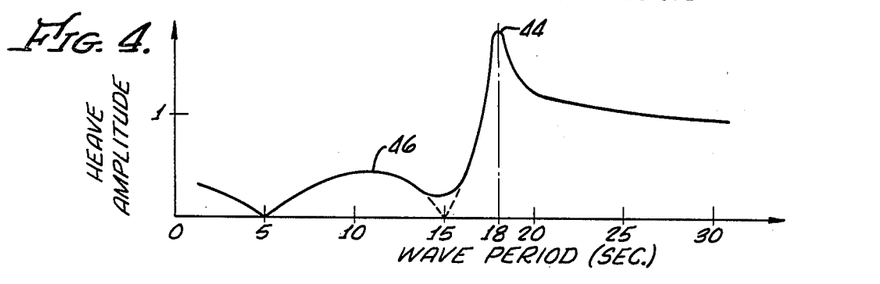
FIG. 4 illustrates a typical heave response curve of a semi-submersible platform, FIG. 5 graphically depicts heave response of a platform with and without application of principles of the present invention.

A semi-submersible platform is a resonant system and may be designed so that heave forces exerted by the columns and by the pontoons of the system exactly cancel at some given wave period. Thus, a semi-submersible platform of the tyoe shown in FIG. 1 will have a heave response illustrated by the curve of FIG. 4 in which heave amplitude is plotted vertically and exciting wave periods are plotted horizontally. Heave motion of the platform of FIG. 1 has a resonant peak 44 at about 18 seconds, as previously mentioned and a low point at 15 seconds. However, the low point at 15 seconds, the period at which the heave force amplitudes of columns and pontoons are designed to be equal and opposite is not actually zero because of small amounts of drag on the platform. A low period hump appears on the response curve as indicated at 46. In many cases, it is this hump 46 that causes significant problems in heave motion. The magnitude of the hump in the curve of FIG. 4 at point 46 is about 0.4 of the wave amplitude. The magnitude of the resonant peak at 44 may be as much as 1.5 or 2.0 times as great as the wave magnitude. Thus, a platform having a response curve as illustrated in FIG. 4, may heave 4 feet in a sea wherein the wave period is 10 seconds and wave height is 10 feet, but will heave as much as 20 feet in seas having the same 10 foot wave height but having a longer 18 second wave period.

Primary heave problems of a semi-submersible platform are caused by the hummp 46 of the heave response curve. It is possible to reduce these adverse effects by redesigning the platform so that its heave response curve will have the short period hump 46 moved to the left in FIG. 4 so that it occurs at even shorter wave periods. The adverse effects of the hump 46 are then decreased because the height of the hump is lower for such a design. However, in such redesign to move the hump 46 to the left, the resonant peak 44 is also moved to the left, to shorter wave periods. This is a heretofore undesirable design since such wave periods of less than 18 seconds are more likely to occur and, therefore, the platform is more likely to be subject to waves at its now lowered resonance.

According to principles of the present invention, the platform may be redesigned so as to move its heave response curve (and hump 46) to the left, to shorter wave periods, and the adverse effects of the concomitantly lowered heave resonant period are minimized by a unique heave damping. Surprisingly and unexpectedly it is found that effective damping at heave resonance can be achieved by exertion of relatively modest magnitudes of properly applied anti-heave force. More specifically, it is found that resonant oscillation of a platform in heave may be effectively and economically decreased to acceptable levels by applying to the semi-submersible structure an oscillatory force in opposition to the platform oscillation and which force is a function of the platform oscillatory velocity.

The effects of velocity damping and the significance of applying a force that is a function of and in phase opposition to velocity, as distinguished from a force that is a function of displacement or acceleration for example, may be understood by considering the basic equations of oscillatory motion of a damped resonant system. Such equation may be written as $$m\ddot{x} + c\dot{x} + kx = P_o \sin \omega t \qquad \text{Eq. (1)}$$

where, $x$, $\dot{x}$, and $\ddot{x}$ are displacement, velocity and acceleration respectively, $k$ is the coefficient of restitution (or spring constant), $c$ is the coefficient of damping, $m$ is the system mass, $P_o$ is the peak amplitude of the exciting force, $\omega$ is the frequency of variation of the disturbing force, and $t$ is time. By dividing through by $m$ Equation (1) may be written $$\ddot{x} + p\dot{x} + rx = F_o \sin \omega t \qquad \text{Eq. (2)}$$

where $p$ is equal to $k/m$, $r$ is equal to $c/m$ and $F_o$ is equal to $P_o/m$. From equation (2) it may be shown that the system displacement may be defined as $$x = \frac{F_o \sin (\omega t - \epsilon)}{[(r - \omega^2) + p^2\omega^2]^{\frac{1}{2}}} \qquad \text{Eq. (3)}$$

where $\epsilon$ is the phase angle. System velocity may be expressed as $$\dot{x} = \frac{F_o \omega \cos (\omega t - \epsilon)}{[(r - \omega^2)^2 + p^2\omega^2]^{\frac{1}{2}}} \qquad \text{Eq. (4)}$$

From Eq. (2) we may define the damping force as $$p\dot{x} = F_o \frac{p\omega\cos (\omega t - \epsilon)}{[(r - \omega^2)^2 + p^2\omega^2]^{\frac{1}{2}}} \qquad \text{Eq. (5)}$$

At resonance $r - \omega^2$ is equal to zero and the phase angle $\epsilon$ is 90°. Thus we may write $$p\dot{x} = F_o \frac{p\omega}{(p^2\omega^2)^{\frac{1}{2}}} \cos (\omega t - \pi/2) = F_o \sin \omega t \qquad \text{Eq. (6)}$$

Eq. (6) states that the damping force $p\dot{x}$ is equal to the exciting force $F_o \sin \omega t$ at resonance. In other words, all other forces acting on the platform, the inertia due to mass and acceleration, and the spring force due to the spring constant and its displacement, have no net effect upon the platform (being mutually equal and opposite at resonance). The only remaining force exerted by the platform in reaction to the exciting force is the damping force. Accordingly, if a damping force is provided as a function of the platform velocity (e.g. rate of change of displacement), it will effectively oppose the exciting force. Eq. 6 is true only at resonance. It can be seen from eq. (5) that at other frequencies the amplitude of force $p\dot{x}$ will not be $F_o \sin \omega t$ but will be smaller because the term $(r-\omega^2)^2$ will not be zero. This term furthermore is always positive since it is the square of a number. Therefore, the described damping generates a damping force that has a maximum amplitude exactly where it is most beneficial, namely at resonance, and it de-emphasizes the damping effect at other frequencies.

It can be shown mathematically that when an anti-heave force is applied in opposition to sensed acceleration (as distinguished from sensed velocity) there is actually no reduction of the peak of the response curve at system resonance. Actually, this peak is shifted toward a longer wave period. Thus the present invention employs an effective anti-heave resonance force that is a function of velocity.

From inspection of Eq. (6) it can be seen that if one generates a force proportional to platform velocity in heave, then at heave resonance, this generated force is exactly equal to wave produced driving force acting on the platform. Further, the damping force $p\dot{x}$, the product of the system velocity and damping coefficient, has a constant peak value at resonance regardless of the damping coefficient. Thus, if one increases the damping coefficient, as for example by increasing the gain of the servo system of FIG. 7 (to be described below) the coefficient $p$ is increased in Eq. (6) but this increased damping concomitantly decreases the velocity $x$ so that the product of the two remains constant. Similarly, if one decreases the coefficient of damping, velocity increases and the product of the two still remains constant. Of course, with a sinusoidal disturbing force such as $F_o \sin \omega t$ the damping force $p\dot{x}$ itself is also sinusoidal. In the systems described herein, this aspect, namely the fixed peak value of damping force at resonance, will exist as long as the magnitude of force required to be exerted in opposition to the disturbing force remains within the limits of the forces available from the force generating system.

Figure 5:
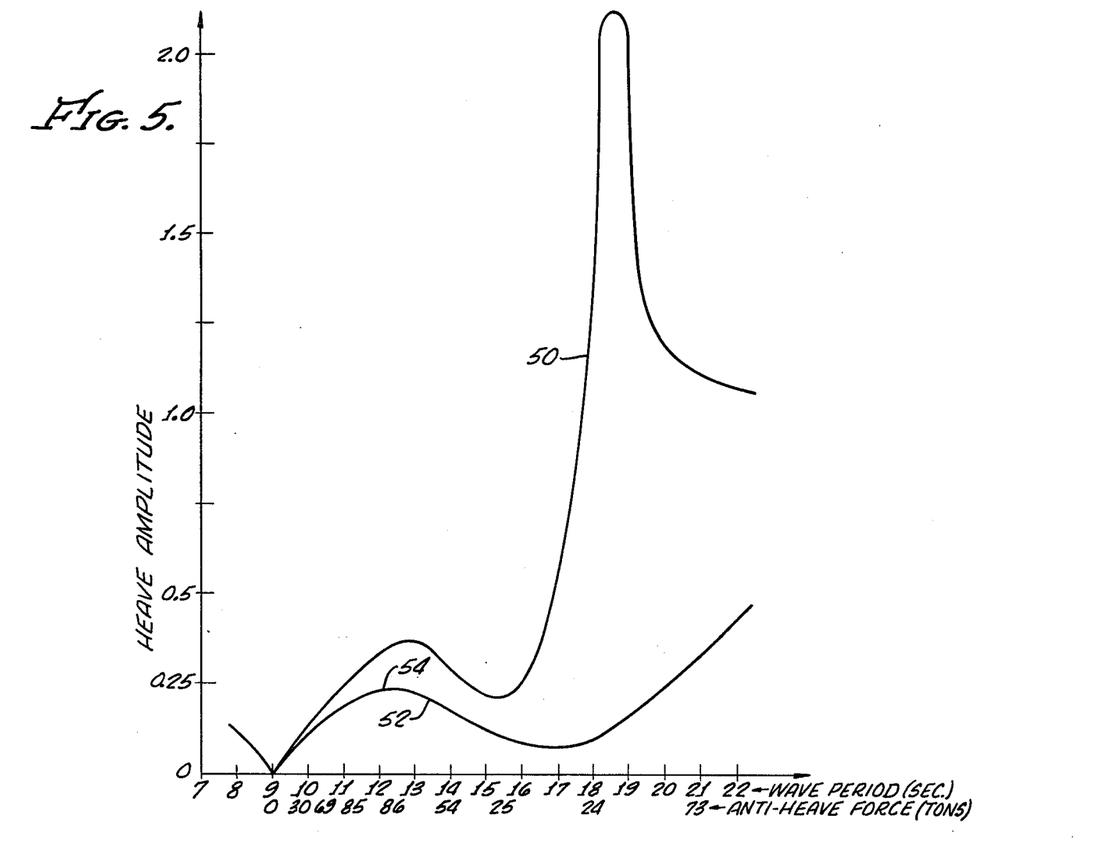

FIG. 5 shows experimentally obtained results of velocity proportional damping according to Eq. (2) upon a scale model of the semi-submersible platform of FIG. 1, showing platform heave amplitude plotted vertically and wave period in seconds plotted horizontally. Curve 50 illustrates the typical heave response curve with very small amounts of damping such as is achieved by virtue of drag of the platform structure. Curve 52 shows the heave response of the same platform with 50% critical damping in the presence of 15 foot waves. Critical damping is the amount of damping that causes a resonant system, when displaced from a rest position, to tend to return to the rest position, approaching such position as an assymptote but just barely avoiding an opposite sense displacement. Mathematically a damped harmonic system such as a system described in Eq. (1) is critically damped if $c^2 = 4$ mk. From the curve of FIG. 5 it will be seen that heave amplitude at the 18 second system resonant period is significantly reduced, from a magnitude of more than twice the wave amplitude to a magnitude in the order of 0.1 times the wave amplitude. Further, this damping as a function of heave velocity has decreased the magnitude of the heave response for wave periods less than the resonant period, decreasing the short period hump 54 from a value of nearly 0.4 to a value of less than 0.25. Thus it can be seen from the equations set forth above and from the experimentally determined results of which FIG. 5 is merely typical, that heave response of a semi-submersible platform is reduced to acceptable levels even for wave periods equal to the resonant period of the structure. Surprisingly, heave amplitude is also significantly reduced at even lower wave periods.

In carrying out the present invention many different types of systems may be employed to achieve increased damping in heave and in particular to generate damping forces as a function of heave velocity in accordance with the principles described above. Such systems may be passive, active hydrostatic or active hydrodynamic.

In an active hydrostatic system, sea water or some other liquid is taken aboard or forced out of the hull in some manner so that the required variable vertical forces are obtained by means of the varying weight of the ballast water. In linear (Newtonian) damping the amount of water that is aboard, above a mean water level, is at all times made to be proportional to the vertical upward velocity of the platform. If the velocity is downward, a corresponding amount of water, below the mean water level, must have been forced out of the ballast tanks. Pumps or equivalent devices are controlled by some type of vertical sensor. Other non-linear functions of velocity may be employed as will be described below.

Ballast tanks can be located in the columns or in the horizontal tubular members. To minimize pumping work the pressure of the air above the water in the ballast tanks should be approximately equal to the average outside water pressure at the same depth. The water can be forced in and out of the ballast tanks by means of water pumps or equivalent devices but in view of the large volume flow rates, it is preferred to employ air pressure for moving the water.

Figure 6:
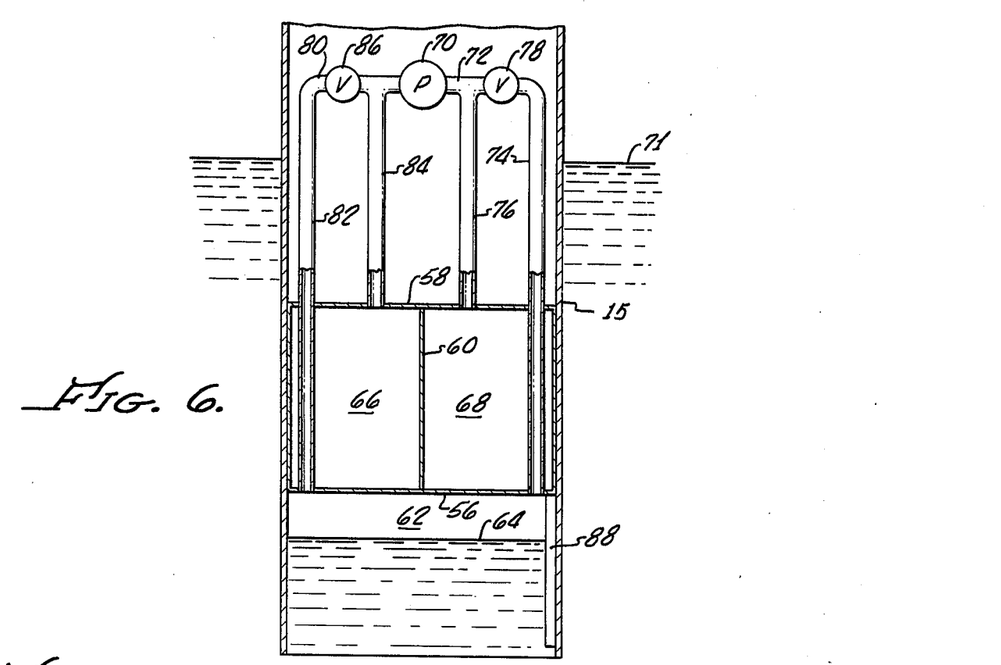
FIG. 6 shows an arrangement for hydrostatic velocity damping of the platform of FIG. 1.

Illustrated in FIG. 6 is an exemplary system employing air pressure for moving the water so as to maintain an amount of water above or below a mean water level that is always proportional to the vertical velocity of the platform. In the arrangement shown in FIG. 6, the stabilizing mechanism is located in one of the columns, such as column 12, which in this case is open at its bottom to ambient water. Preferably an identical system is provided in each of the four columns or in each column where other numbers of columns are provided in a platform of different design. By means of upper and lower horizontally extending bulkheads 56 and 58, together with a vertically extending transverse bulkhead 60, a lower portion of the column is divided into three different chambers containing air or some other gas, including a chamber 62 defined between the water surface 64 and lower bulkhead 56, and first and second side by side chambers 66 and 68 defined between bulkheads 58 and 56 and transverse bulkhead 60. A pump 70 is provided having an intake conduit 72 that communicates with chamber 62 via a conduit 74 and with chamber 68 via a conduit 76. A valve 78 is provided in the intake conduit 72 between its junction with conduits 74 and 76. Pump 70 also has an exhaust conduit 80 which communicates with chamber 62 by means of a conduit 82 and with chamber 66 by means of a conduit 84. A valve 86 is positioned in exhaust conduit 80 between its junction with conduits 82 and 84.

Water level in the ballast tank, which is in effect the open bottom of the column 12, is controlled by pressure of air in the chamber 62. A water level sensor 88 is provided in the lower end of the column to furnish a signal to control circuitry to be described below indicating the amount of ballast water aboard the platform and therefore indicating the magnitude of the anti-heave force exerted.

The illustrated arrangement, always pumping air in the same direction, normally maintains a relatively higher pressure in chamber 66 and a relatively lower chamber in 68. If valve 86 is opened, high pressure air from the chamber 66 enters chamber 62 and forces water out of the ballast tank thereby increasing the vertical upward force on the platform. If valve 78 is opened, air from chamber 62 enters the lower pressure chamber 68, thereby taking additional water aboard and providing a component of downward vertical thrust. In an exemplary arrangement the water level 64 may be roughly at a depth of 70 feet and the pressure in chamber 62 will be at about 45 pounds per square inch, which is about the pressure of the ambient water. In this arrangement the high pressure tank 66 will have a pressure of about 55 pounds per square inch and chamber 68 will have a pressure of about 35 pounds per square inch. This arrangement helps to decrease the work required from the pump. Pump 70 is caused to run constantly at a fixed speed and in but one direction to maintain this pressure differential in the chamber 66 and 68. The pump is shown located at a position above the water level 71 surrounding the column. Pump location may be widely varied. The pump may be located in the wall 60 between chambers 66 and 68 or considerably above either of these chambers, on the platform deck for example, for easy access or servicing. The pump is preferably run continuously and at a fairly constant power level determined by sea conditions, running at higher levels in higher seas and at lower levels in lower seas. Preferably the pump is a Roots type pump, a high capacity low pressure blower.

Figure 7:
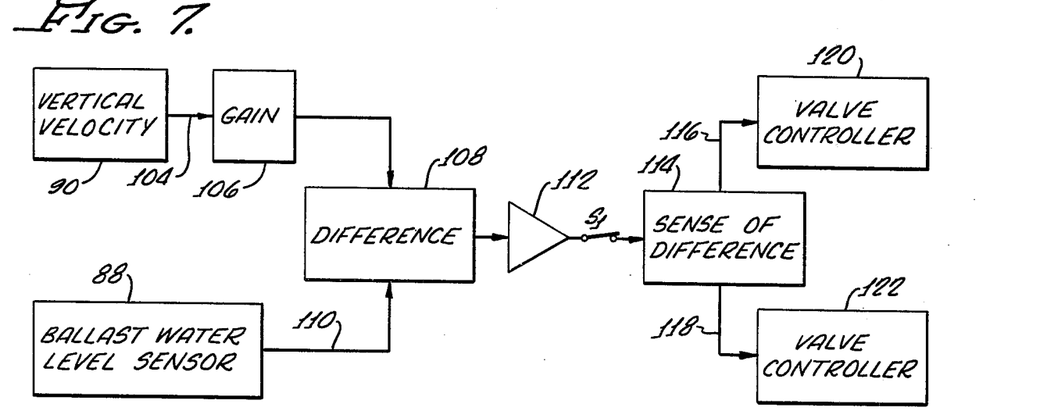
FIG. 7 is a block diagram of a closed loop control system for the arrangement of FIG. 6.
Figure 8:
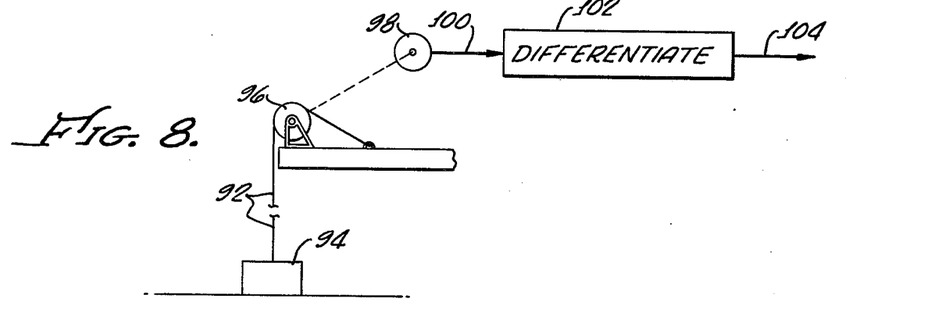
FIG. 8 illustrates an exemplary form of heave displacement and velocity sensor.

A control system, such as illustrated in FIG. 7 is employed to operate the valves of FIG. 6. A vertical velocity sensor 90 is connected to sense vertical heave velocity of the platform and generate an electrical signal proportional to such velocity. Velocity sensor 90 may be any one of a number of types of conventional instruments. It may be an acceleration sensing device of which the output is integrated to provide velocity or it may be a vertical displacement sensing device of which the output is differentiated to provide velocity. Such a displacement sensing device is illustrated in FIG. 8 which shows a cable 92 fixed at one end to a weight 94 placed on the sea bottom. The cable extends upwardly and is entrained over a sheave 96 on the platform deck, having its other end fixed to the deck. Accordingly, rotation of the sheave shaft is directly proportional to vertical heave displacement of the platform. Sheave shaft rotation is caused to drive the arm of a potentiometer 98 which provides an electrical output signal on a lead 100 that is directly proportional to vertical platform displacement. This signal is electrically differentiated in a differentiating circuit 102 to provide on an output lead 104 an electrical signal directly proportional to the first derivative of displacement e.g. platform velocity and having a polarity according to the sense (up or down) of the velocity.

This velocity signal on lead 104 is fed to a gain controlling circuit 106 (FIG. 7) which provides a first one of two inputs to a difference circuit 108. A second input to the difference circuit 108 is provided as an electrical signal on a lead 110 from the ballast water level detector 88 of FIG. 6. The water level signal on lead 110 is proportional to the water level (and water volume for the constant cross section ballast tank) above or below a mean and has a polarity according to the sense of the water level relative to the mean. The difference circuit provides an output control signal proportional to the algebraic difference between the two inputs thereto which difference signal is amplified in an amplifier 112 and fed to a sense circuit 114 which provides an output signal on leads 116 and 118 according to the sense of the difference between the two inputs to circuit 108. The signal on 116 is fed to a valve controller 120 for control of valve 78 and the signal on lead 118 is fed to a valve controller 122 for control of the valve 86. The valves are controlled so that water level in the ballast tank is changed in a sense to diminish the control signal that is provided as the output of difference circuit 108.

Assuming that at a given instant heave motion is upward, a damping force of the appropriate direction is produced if the water level in the ballast tank is higher than the mean level by an amount that is proportional (for linear damping) to the upward velocity. If the water level is not high enough, the assumed positive velocity signal is greater than the positive ballast signal and there is a positive difference signal from the difference circuit 108, since the positive water level signal is subtracted from the positive heave velocity signal. The positive difference signal is detected by the difference circuit 114 to send a signal via line 116 to operate valve controller 120 which controls the low pressure valve 78. This valve is then opened to lower the pressure in chamber 62 to take more water into the ballast tank until the amount of water in the tank is equal to the sensed velocity whereupon the difference signal becomes zero and the valve 78 is closed. If the water level in the tank is too high and velocity is upward, valve 86 is operated since the difference signal is now negative (the larger positive ballast signal is subtracted from the smaller positive velocity signal) and the difference signal 114 operates valve controller 122 which opens valve 86 to increase the pressure in chamber 62 and drive more water from the ballast tank until the difference signal again becomes zero.

A similar operation takes place with a downward heave velocity in which case the heave velocity signal is negative. The water level in the ballast tank is lower than the mean water level so that the water level signal from detector 88 is also negative. Assuming that the water level is not sufficiently low, the negative water level signal is then algebraically subtracted from the negative velocity signal and the difference signal is negative. The negative difference, just as before, causes the difference circuit 114 to operate controller 122 and valve 86 to force water from the ballast tank until the difference signal becomes zero. If the water level is too low in the case of a downward velocity, the difference signal is now positive (because the larger negative water level signal is subtracted from the relatively smaller negative velocity signal) and valve 78 is opened to draw more water into the ballast tank until the difference signal is zero.

The system of FIGS. 6 and 7 operates to maintain the quantity of water above or below the mean level in the ballast tanks substantially equal to the sensed vertical velocity at all times. Thus, the ballast tank will provide a force in a direction that tends to decrease the heave motion and this force will have a magnitude proportional to the magnitude of the sensed vertical or heave velocity.

In the closed loop control system of FIG. 7 the signals fed to the valve controllers 120 and 122 need not be proportional to the sensed difference since this closed system may operate in a conventional on/off servo loop fashion. In effect, the anti-heave force (the force exerted by the ballast water) is sensed and controlled so as to remain proportional to the sensed vertical velocity.

Figures 9, 10, 14:
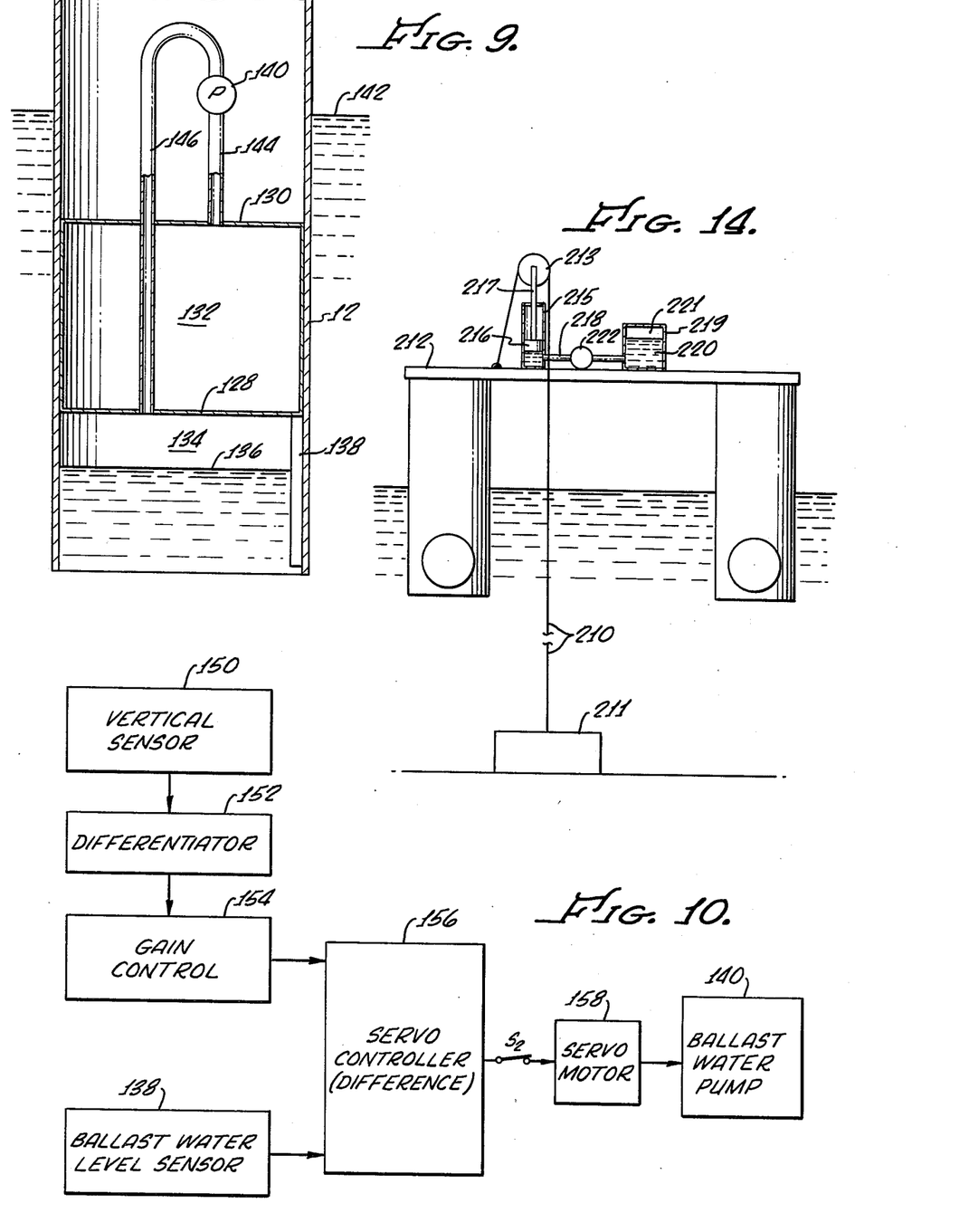
FIG. 9 illustrates an alternate hydrostatic arrangement for velocity damping the platform of FIG. 1.
FIG. 10 is a block diagram of a control system for the arrangement of FIG. 9.
FIG. 14 illustrates a passive stabilization system embodying velocity damping incorporated in a tensioned platform tether.

Illustrated in FIG. 9 is a modified hydrostatic stabilization system in which each column is again provided with controlled air pressure chambers and ballast tanks operated to cause the amount of ballast to be varied in such a manner as to exert an anti-heave force proportional to sensed vertical velocity. In the arrangement of FIG. 9 one or more of the platform columns, such as column 12, is again open at its bottom to the ambient sea water and provided with upper and lower horizontally extending or otherwise transverse bulkheads 128, 130 which divide the lower part of the column into a first chamber 132 defined between the two bulkheads and the interior of the column and a second chamber 134 defined between the lower bulkhead 128 and the surface 136 of ambient water confined within the column. A liquid level sensor 138 is mounted within the chamber 134 to provide an electrical output signal proportional to the level of water in chamber 134 above or below a predetermined mean and having an appropriate polarity in a manner substantially identical to the operation of the water level sensor 88 of FIG. 6. A pump 140, suitably mounted to or near the column and preferably above the ambient water level 142, has a first duct 144 in communication with chamber 132 and a second duct 146 in communication with chamber 134. In the arrangement of FIG. 9 the average air pressure is the same in each of chambers 132 and 134 and is equal to the ambient pressure in the sea water outside of the column at the same depth as the mean water level in chamber 134. This minimizes work required of the pump. Pump 140 is capable of pumping air in either direction. The pump is employed to raise or lower the pressure in chamber 134 and accordingly to lower or raise the level of water in the chamber as is required to obtain the required damping force. In this arrangement no valves are required. The control system for the hydrostatic arrangement of FIG. 9 is illustrated in FIG. 10 and comprises for this controlled loop control system, a vertical velocity sensor formed of a heave sensor 150 having an output signal (with a magnitude proportional to displacement and a sense according to direction of displacement) that is differentiated in a circuit 152 to feed a signal proportional to heave velocity to a gain control circuit 154. By employing a gain control for the velocity signal the effective damping coefficient of the system is readily varied by changing this gain. A servo controller 156 operates as a difference circuit, receiving a first input from the gain controller 154 and a second input from the ballast water level sensor 138. Controller 156 operates a servo motor 158 in one direction or another depending upon the sense of the algebraic difference between the two signals fed to the controller. Servo motor 158 drives the ballast water pump 140 in one direction or another so as to maintain the anti-heave force exerted by the ballast water proportional to the sensed velocity of platform heave.

The operation is substantially the same as described in connection with FIG. 7 except that instead of operating one or another of a pair of valves, the system drives the pump in one direction or the other. The controller 156 provides an output control or difference signal according to the algebraic difference between the two input signals thereto. The pump 140 is driven in the proper direction to change the water level so as to diminish the control or difference signal. Just as in the system of FIGS. 6 and 7 by maintaining the control signal at zero the anti-heave force exerted by the ballast water is equal and in phase opposition to (at resonance) the heaving force exerted upon the platform by the wave motion.

The control loop of FIG. 9 is preferably of the "bang-bang" type or on/off type although it could be readily made as a proportional system in which the pump is operated in proportion to the difference signal from the servo controller. As previously stated, it is significant according to principles of the present invention that the force exerted by the ballast water be a function of the sensed heave velocity. The force exerted by the ballast water, of course, is directly proportional to the volume of ballast water above or below the mean, and the water level above or below the mean is directly proportional to volume for a tank of constant cross section, although other tank cross sections may be employed with suitable compensation for non-linearity. The rate of change of volume of ballast water itself is a function of the rate of change of sensed velocity. In other words, the rate of flow of the ballast water is a function of sensed acceleration and this can provide a variant of the invention described herein. Thus, a modification of the control system of FIG. 10, for example would provide an open loop system substantially similar to the arrangement of FIG. 10 but omitting the ballast water level sensor and substituting for the vertical velocity sensor 150, 152, an acceleration sensor (not shown). When using such an acceleration sensor, the servo motor drives the ballast water pump at a rate proportional to sensed acceleration.

It is to be emphasized that in this arrangement, when the rate of pumping of ballast water is proportional to acceleration, the actual anti-heave force itself is proportional to velocity. This is quite a different arrangement than a situation in which anti-heave force is made proportional to acceleration. With force proportional to acceleration, the force is not in phase with the exciting force. As previously explained, it is the platform velocity, not the platform acceleration, that is in phase with the exciting force of the waves at resonance. Obviously, if platform velocity is in phase with the exciting force, the platform acceleration is in phase quadrature, or at 90° phase relation, with respect to the exciting force.

Employing an opposing force directly in phase with (or, more rigorously, a force in phase opposition to) the disturbing force at resonance, according to principles of the present invention, opposing or anti-heave forces of considerably lesser magnitude provide a surprisingly effective decrease in heave amplitude. In fact, as shown in the curve of FIG. 5, damping forces of quite readily available and economically feasible magnitude may be applied to achieve the considerably diminished heave response curve 52. Magnitudes of these damping forces in tons per column for wave heights of 15 feet are shown below the horizontal line of the graph of FIG. 5 for certain wave periods. Thus, at resonance, a peak damping force of about 24 tons per column is employed to achieve the illustrated decrease in heave magnitude from a value greater than twice the wave height to a value of but one-tenth the wave height. This 24 ton peak force, of course, will vary with a period of 18 seconds, varying sinusoidally with the sinusoidal variation of heave velocity and wave force.

The described arrangement of applying anti-heave forces as a function of sensed velocity is most effective at the resonant period of the platform but does have considerable beneficial effect at other periods. Thus, as illustrated in FIG. 5, the short period hump 54 of the heave response is also considerably diminished. At this wave period of about 12.5 seconds velocity damping according to principles of the present invention employs a peak damping force of about 86 tons per column. It may be noted that such force magnitudes are quite feasible since in a platform of the type illustrated in FIG. 1, having a column diameter of 40 feet, a 50 ton force may be exerted by a change in water level in the column from the mean of approximately 1.5 feet. The forces identified in FIG. 5 are forces exerted in each column, it being understood and presumed that a velocity responsive stabilization system of a type shown in FIGS. 6 and 7 or 9 and 10 is employed in each of the four columns of the platform.

Figure 11:
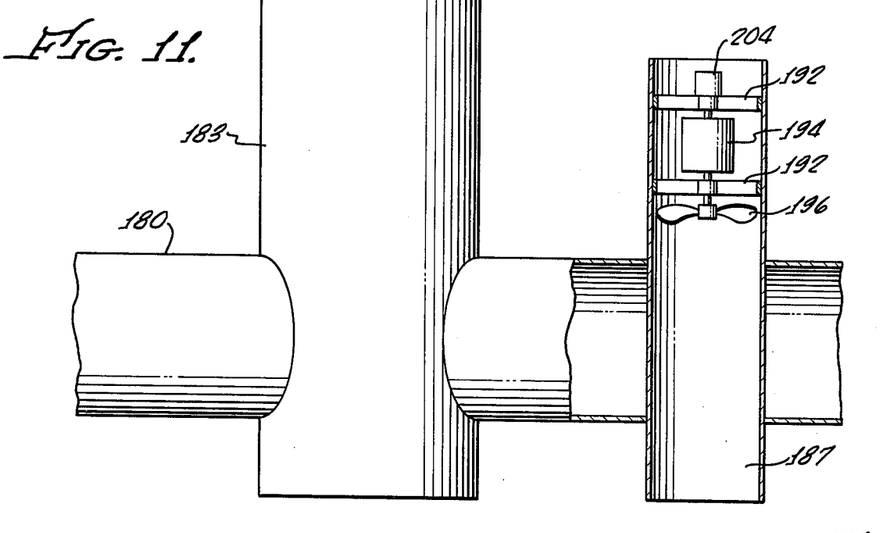
FIGS. 11 and 12 illustrates an arrangement of thrusters for achieving hydrodynamic stabilization.
Figures 12, 13, 15:
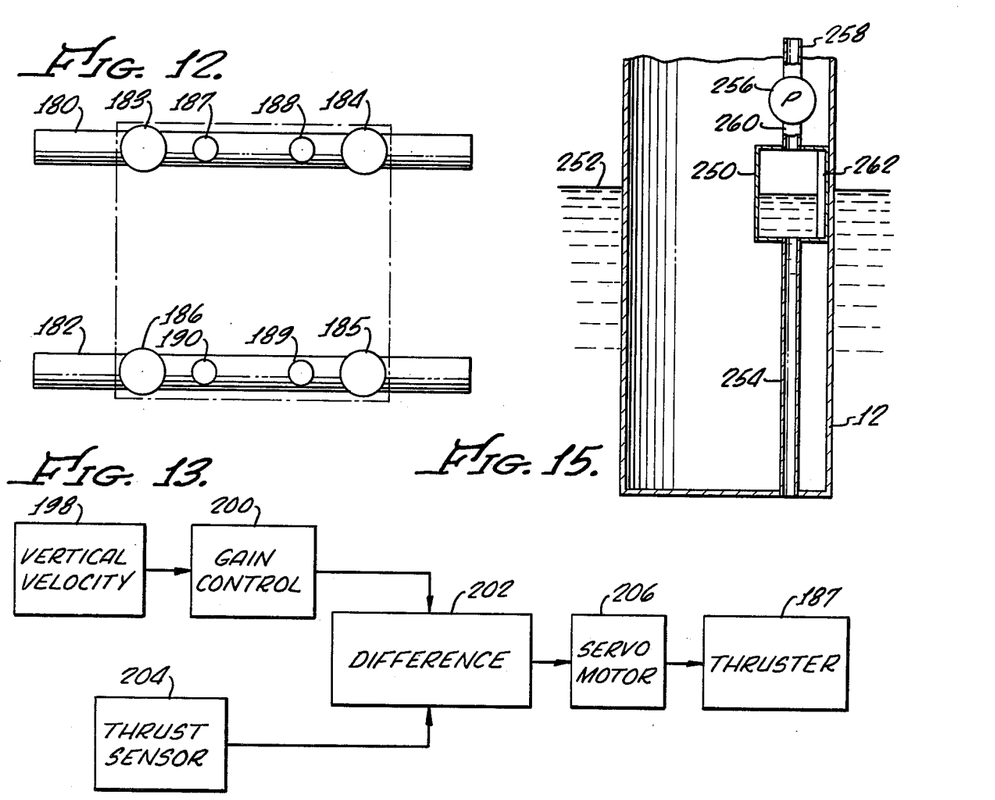
FIG. 13 is a block diagram of a control system for the hydrodynamic stabilization of FIGS. 11 and 12.
FIG. 15 shows another form of hydrostatic velocity damping.

Illustrated in FIG. 11 is an hydrodynamic arrangement for effecting heave stabilization. As shown in FIGS. 11 and 12, each of the pontoons 180, 182 connected to columns 183, 184, 185 and 186 of the type previously described in connection with the platform of FIG. 1, is provided with vertically extended ducts 187, 188, 189 and 190, open at both top and bottom and extending through the pontoons adjacent an associated one of the four columns. In each of the ducts is mounted a fixed skeletal support 192 to which is secured a motor 194 driving a thruster or propeller 196. The propellers are employed for the generation of the desired damping forces. The propellers or thrusters may be of many different designs and many locations are readily available. They may be placed in the columns or in structures adjacent to the columns. However, the illustrated arrangement with the ducts 187 through 190 being placed in the pontoons is preferred.

An exemplary control system for the hydrodynamic arrangement of FIGS. 11 and 12 is shown in FIG. 13 wherein a vertical velocity sensor 198 of the type previously described in connection with FIG. 8 is employed to provide an output electrical signal proportional to the magnitude of the sensed vertical heave velocity and having a polarity in accordance with the direction of the velocity. The velocity signal is fed via a gain control circuit 200 to a difference circuit or servo controller 202 which receives as a second input the output electrical signal from a thrust sensor 204 mounted to the support 192 so as to sense magnitude and direction of thrust of the propeller 196. Difference circuit 202 provides an output control signal to a servo motor 206 that has a magnitude proportional to the difference between sensed thrust and sensed vertical velocity and which has a polarity in accordance with the sense of such difference. Servo motor 206 drives the motor 194 to drive the propeller 196 and provide a thrust that is a function of the sensed velocity. The output of the thruster, that is the axial vertical force exerted by the propeller, may be controlled by control of either the rotational speed of the propeller or by varying the propeller blade pitch. In alternate arrangements (not shown) the thruster may take the form of propeller or rotor blades encircling a normal or a decreased diameter portion of the columns with the outermost edges of the propeller blades protected by a circumferential shroud that cooperates with the exterior of the column to form a duct for passage of the water driven by the thrust. The control system of FIG. 13, and the control systems to FIGS. 7 and 10 also, employ conventional known components commonly used in servo control systems. Details of these control systems may be varied as deemed necessary or desirable without departing from principles of the present invention.

Although thruster systems are in some ways more attractive than ballast systems, they have the disadvantage of requiring more power for their operation. However, power requirements for the thruster can be reduced by a design that exploits the need for an oscillatory thrust employing variable pitch propellers or reversible constant pitch variable speed propellers. Thrust and pitch reversals are, of course, required at the frequency of motion of the platform.

By making the ducts 187–190 of sufficient length, the inertia of the water mass located in the duct becomes large enough to have a significant effect upon the thrust reversals that necessarily occur in operation of this system. The effect is to reduce the required thruster power, thus minimizing a major thruster problem, namely high power requirements. The power reduction is due to the fact that essentially the same water, mass reciprocally driven is accelerated and decelerated by the thrusters. Ideally, kinetic energy imparted in one half cycle is recovered in the next half cycle.

The systems described herein employ arrangements to create anti-heave forces that are in phase opposition to and proportional to the heave velocity of the platform (Newtonian damping). Nevertheless, it is also contemplated to employ anti-heave forces that are other functions of heave velocity. The anti-heave force may be made some nonlinear function of velocity. Many such nonlinear functions are possible within the scope of the present invention. Thus, the anti-heave force may be made proportional to the square of the sensed velocity, in which case relatively small amounts of damping are provided at low velocities and exceedingly large damping is applied at higher velocities. In such a situation, the damping force increases as the square of the velocity.

Still another nonlinear function is a proportional or linear damping function with saturation. Such a function is preferred, at least in part, because it is most likely to be available from actual apparatus. In such a saturated proportional damping function the anti-heave or damping force is directly proportional to velocity over a predetermined magnitude of velocity. At such predetermined magnitudes of velocity the damping force generator becomes saturated, that is, it is unable to or will not generate any further increased damping force and thus for all velocity magnitudes (whether upward or downward) above a predetermined velocity magnitude the damping force has a fixed value. For velocities less than such predetermined velocity magnitude the damping force is directly proportional to the sensed velocity. For example, when damping is achieved by a thruster having a finite maximum power, it is possible that some sea conditions would cause velocities which, at a selected gain of the system, would demand for linear operation an anti-heave thrust beyond the maximum thrust available from the thruster. When the thruster reaches the limit of its output it can increase its thrust no further and thus for further increases in velocity no further thrust increase is available. Therefore, such an arrangement will naturally provide a proportional damping with saturation. Similarly in a hydrostatic embodiment of the present invention, the ballast tank has a finite volume and when the ballast tank is full, it can no longer exert increased downward anti-heave force. When the ballast tank is completely empty it can no longer exert any increase in upward anti-heave force. Thus, this system may also be proportional between predetermined limits of velocity magnitudes but saturated at velocities above such magnitudes.

The described systems are continuously operable, generating the anti-heave forces at all wave periods. It is also contemplated to employ these systems where the most effective results are obtained, namely in and about the platform resonant period. Thus, the period of wave motion may be sensed and the described anti-heave system energized solely for those wave periods that are, for example within a few seconds of the resonant period of the platform. This may be achieved simply by the use of a switch, such as indicated at S1 and S2 in FIGS. 7 and 10 respectively, which is normally open to disable the system, but is manually closed when wave periods increase toward the resonant period. Wave periods may be determined by an observer or may be sensed in a system that automatically operates the switches S1 or S2. A low pass filter (not shown) to pass only lower frequencies of the sensed velocity may be employed, as between gain control circuit 154 and controller 156 of FIG. 10, for example, for automatically disabling the system at periods shorter than a period just below the resonant period.

Significant power savings in the present invention are achieved by shutting off the damping or heave stabilization system at wave periods less than the resonant period of the platform, preferably at periods below the trough of the response curve of FIG. 5, which is shown in this figure to occur at about 15 seconds. The reason for this savings may be understood from the inspection of the curves of FIG. 2 which show that the column force indicated by curve 32 remains constant as the wave period varies. However, the pontoon force, indicated by curve 34 increases rapidly as wave period decreases. From another point of view, the corrected difference curve 40 has a significantly increasing magnitude as the wave periods decrease below the illustrative 15 second period at which the column and pontoon forces are equal and opposite to each other (point 36 of the curve of FIG. 2). Furthermore, relatively large anti-heave forces are generated at wave periods below the response curve null (as can be seen in FIG. 5 for the hump 54 of the curve 52) and thus at such lower wave periods more power is required for lesser desirable effects. The curve 52 of FIG. 5 shows the diminished heave response curve for linear damping applied throughout the illustrated range of wave periods, and does not show a system in which the damping has been cut off at periods below the resonance.

Illustrated in FIG. 14 is a type of passive damping which, just as the previously described hydrostatic and hydrodynamic active systems, exerts an anti-heave force proportional to heave velocity and thus effectively counteracts heave oscillation at platform resonance.

The passive stabilization system of FIG. 14 comprises a tensioned cable or tether 210 connected at one end to a weight 211 on the sea bottom and at its other end to a fixed structure on platform deck 212, being entrained over a sheave 213. A cylinder 215 is mounted to the deck structure and confines a piston 216 having a piston rod 217 connected to support the sheave 213. Cylinder 215 is filled with oil below the piston and contains a vented air mass above the piston. It is connected via a conduit 218 to the interior of an oil reservoir 219 confining a body of oil 220 under pressure of a pressurized gas 221 within the reservoir 219. A restrictive orifice 222 is interposed in conduit 218 to impose upon the flow of oil between the cylinder 215 and reservoir 219 a restrictive force that is a function of flow velocity. Except for the restrictive orifice 222 the apparatus of FIG. 14 is prior art. Surprisingly and unexpectedly, it is found that by inserting a flow restricting orifice, to restrict flow of oil to and from cylinder 215, a true velocity damping is achieved which will substantially minimize heave amplitude at heave resonance.

Tether 210 is maintained under a large amount of tension, in the order of 100 tons or more for a platform of the type described above. The tension force is provided by the pressurized oil in cylinder 215. The restriction of the oil flow between the cylinder and the reservoir cooperates with the tensioned tether to provide damping as a function of the heave velocity. This passive arrangement inherently reacts to vary the tension force in the tether in accordance with the actual heave velocity. As the platform rises in the presence of a disturbing wave, piston 216 tends to move downwardly within the cylinder 215. Its downward motion relative to the cylinder is restrained in part by the restriction of the flow of oil from the cylinder to the reservoir 219, such restriction being imposed by the restrictive flow orifice 222. Thus, the piston and piston rod acts between the sheave and the tensioned tether 210 to increase the tension in the tether and to exert an increased downward force upon the upwardly moving platform, such increase of force being a function of the upward velocity.

As the platform moves downwardly, tension in the tether is decreased and pressurized oil in the reservoir tends to urge the piston upwardly relative to the cylinder to oppose this decrease in tension. However, flow of oil from the reservoir 219 to the cylinder is again restricted by the orifice 222 and thus the downward force exerted on the platform by the tensioned tether 210 and pressurized oil is diminished, thereby providing a net upward component in opposition to the downward heave motion. The net upward component is a function of the vertical velocity of the platform. The restrictive orifice 222 may actually comprise a number of parallel tubes each providing a flow restriction and each maintaining a laminar flow which accordingly affords a flow restrictive force that is proportional to velocity. Other flow restrictive arrangements may provide restrictive forces (and thus anti-heave forces) which are nonlinear functions of velocity. Another way to maintain the restrictive force or anti-heave force of FIG. 13 proportional to velocity is to employ a number of valves in parallel in the flow path between reservoir 219 and cylinder 215, sensing the pressure within the lower end of cylinder 215 and opening and closing different ones of the restrictive valves in response to the sensed pressure so as to maintain sensed pressure deviations from a reference proportional to the heave velocity which is sensed by arrangements previously described.

Illustrated in FIG. 15 is still another arrangement of an hydrostatic heave stabilization system that is preferred in many situations. This embodiment is substantially similar to the system of FIG. 9 but employs a ballast tank 250 located substantially at the level 252 of water in which the platform is floating. The tank has a water filled conduit 254 extending to the bottom of the platform column 12 in which the tank 250 is mounted. Conduit 254 is open at its bottom to the ambient water. Just as in the arrangement of FIG. 9 a pump 256 is provided. However, this pump has one side connected via a conduit 258 to ambient atmosphere and the other side connected via a conduit 260 to the interior of the ballast tank 250. Thus, in this arrangement no separate pressurized air chamber is employed. Because the ballast tank is at the water surface, the pump can have one side connected to ambient atmosphere and an additional pressurized air reservoir is not required to decrease the load on the pump, as in FIGS. 6 and 9. The system of FIG. 15 is controlled by a control system which may be identical to the control system employed for FIG. 9 to drive the reversible pump 140 of the earlier described embodiment. As previously described, the pump is driven in response to the difference between sensed heave velocity and the volume of water in the ballast tank 250 relative to a mean volume, as detected by a ballast sensor 262.

It will be seen that the utilization of the various arrangements for providing anti-heave forces as a function of vertical velocity enables the design of a semi-submersible platform having a shorter natural heave period than is normally acceptable, which design is characterized by relatively larger column cross sections (providing a larger water plane area) and relatively smaller pontoon diameter. Such a platform has a number of advantages. There is less heave motion at wave periods substantially shorter than the natural heave period. The platform has a larger variable deck load capacity and in addition, it has smaller roll and pitch motions. Decrease of roll and pitch motion will result at least in part from the fact that these motion, although angular displacements, are also caused largely by vertical forces which will be reduced by the above described systems. Thus, significant reason for decrease in roll and pitch is the decreased pontoon size of the platform designed with a shorter natural period.

Ballast tank systems have been described in which the quantity of ballast water is varied either by means of water pumps located in the duct connecting the ballast tank with the sea or by means of air pumps used to vary air pressure in the space above the ballast water. The ballast tanks may be located in the columns at the water line and connected to the sea by means of one duct and to ambient air by means of another. When water pumps are used they may be located in the first duct. When air pumps are used, they would be located in the second duct. By employing valves in the various ducts the system may be operated in a purely passive mode with the pumps off and the valves open or it may be operated in a controlled passive mode by controlling solely the valves without use of the pump, or it may be shut off completely. The ballast tank system may be dimensioned for passive operation so that the natural period of motion of ballast water in and out of the ballast tank in the absence of pumps is approximately equal to the natural period of heave of the platform.

Ballast tank systems as disclosed herein may be located at the lower end of the columns or in the pontoons. They may rely on air of higher than atmospheric pressure to maintain the required level in the ballast tanks as compared with the mean water level of the surrounding water, such required water level being lower than the mean water level of the surrounding sea. The high pressure air is supplied from an air reservoir communicating with the ballast tank by means of a duct. Ballast water may be moved by applying two air reservoirs of relatively high and relatively low air pressure and controlling the connection of such reservoirs to the ballast tank.

Where a hydrodynamic arrangement is employed the thruster may be mounted in a duct of sufficient length for the inertia of the water in such duct to have a significant beneficial effect on the thruster power requirement for an oscillatory thrust application.

It is noted that the heave response curve of FIG. 5 does not represent the result of a platform design that is optimized to take advantage of the described damping of heave resonance. The platform may be designed for still shorter heave resonant periods but may require increased damping and more power for operating the system. However, for the platform illustrated in FIG. 1 having a displacement of 22,850 metric tons and heave damping at 50% of critical value, an average damping system power of 1,040 horsepower is required in a storm sea of 30 foot significant wave height. Power requirements would be somewhat higher when taking into account usual losses in the system. Peak power requirement may be several times larger. As previously mentioned, for greater economy in the use of the power required, the stabilization may be decreased or shut off entirely at wave periods where such stabilization is less effective. The described system provides its greatest effect at heave resonance at which point its average power requirement is considerably smaller and may even be negative very close to resonance.

The foregoing detailed description is to be clearly understood as given by way of illustration and example only, the spirit and scope of this invention being limited solely by the appended claims.

What is claimed is:

1. A floating structure having a resonant period and subject to displacement relative to a reference position in response to wave motion of water in which the structure is floated, said displacement including displacement components of heave, roll and pitch, the structure comprising means for sensing vertical velocity of said structure and damping means responsive to said sensing means for exerting upon said platform a force in opposition to the heaving force exerted by the water upon said structure, said damping means comprising a ballast tank, a pump, and means responsive to the difference between a quantity that is a function of sensed vertical velocity and the volume of liquid in said ballast tank relative to a mean volume for operating said pump.

2. The floating structure of claim 1, including an air reservoir, said pump being connected to pump air between said reservoir and said ballast tank.

3. The floating structure of claim 1 comprising first and second air chambers, said pump is connected to pump air from a first one of said chambers to a second one of said chambers thereby to maintain a pressure difference in said first and second chambers, a first valve controlled conduit connecting said first chamber to said ballast tank, a second valve controlled conduit connecting said second chamber to said ballast tank, and means responsive to said velocity sensing means and to the volume of water in said ballast tank for operating said valves to maintain the volume of water in said ballast tank relative to a mean volume as a predetermined function of sensed vertical velocity.

4. The floating structure of claim 3 wherein said means for operating said valves includes sensing means for sensing the volume of water in said ballast tank, means for generating a valve control signal in accordance with the algebraic difference between the sensed water volume relative to a selected mean water volume and a quantity related to sensed vertical velocity of the platform, and means responsive to said control signal for operating on or the other of said valves to increase or decrease the amount of water in said ballast tank in a sense to diminish said control signal.

5. The floating structure of claim 1 wherein said means responsive to said sensing means comprises a thruster, and means for causing the force exerted by said thruster to vary in accordance with sensed vertical velocity of said structure.

6. The floating structure of claim 5 wherein said thruster comprises a propeller and means for driving said propeller in response to sensed vertical velocity of said floating structure.

7. The floating structure of claim 1, including means for disabling application of said force at oscillatory periods of water motion that are substantially different than said resonant peroid of said structure.

8. A semi-submersible platform comprising:
   a deck structure;
   a substructure including a plurality of columns fixed to and extending below said deck structure;
   a plurality of pontoons fixed to at least some of said columns below said deck structure;
   a liquid ballast tank connected to one of said structures;
   means for sensing vertical velocity of said platform; and
   pump means for moving liquid to and from said ballast tank, ballast liquid sensor means for detecting the quantity of ballast liquid in said ballast tank, and means responsive to said vertical velocity sensing means and said ballast liquid detecting means for driving said pump means in one direction or another to decrease the difference between the quantity of liquid in said ballast tank with respect to a mean quantity and a quantity related to the sensed vertical velocity of said platform.

9. The platform of claim 8 comprising first and second gas reservoirs, means for maintaining a pressure differential between said first and second reservoirs, a first valve controlled duct interconnecting said first reservoir with said ballast tank, a second valve controlled duct interconnecting said second reservoir with said ballast tank, said ballast sensor means detecting the quantity of liquid in said ballast tank with respect to a mean quantity, and means responsive to said ballast sensor means and to said vertical velocity sensing means for opening one or the other of said valves to force liquid into or out of said ballast tank in a sense to maintain the quantity of liquid in said ballast tank with respect to said mean quantity as a predetermined function of said platform vertical velocity.

10. A system for diminishing heave displacement of a floating structure in the presence of disturbing waves, said system comprising
damping means for applying a force to said structure in opposition to forces exerted upon said structure by disturbing waves,
means for detecting the rate of change of heave displacement,
means for detecting force applied to said structure by said damping means, and
means responsive to both of said means for detecting for controlling said damping means to diminish the difference between a function of said rate of change of heave displacement and said force applied by said damping means.

11. The system of claim 10 wherein said damping means comprises at least one ballast tank and wherein said means for controlling said damping means comprises gas chamber means responsive to both said means for detecting for moving liquid to and from said ballast tank 12. The system of claim 10 wherein said damping means comprises at least one ballast tank and wherein said means for controlling said damping means comprises
pump means responsive to both of said means for detecting for moving liquid to and from said ballast tank.

13. The system of claim 10 wherein said damping means comprises a thruster and wherein said means for controlling said damping means comprises control means responsive to both said detecting means for operating said thruster to provide a thrust that is a function of the rate of change of heave displacement.

14. A semi-submersible floating structure comprising:
deck means;
a plurality of main columns attached to and extending below said deck means for submersion in water to provide buoyant supporting force for the structure;
pontoon means attached to said main columns near the lower ends thereof that are adapted to be submerged, said pontoon means having an upper horizontal surface projection which is positioned to remain submerged; and
damping means attached to the structure for exerting damping force thereon substantially in opposition to and as a function of the vertical velocity of the structure attributable to wave motion acting on the plurality of columns and pontoon means, said damping means includes ballast chambers in selected ones of the columns and pontoon means, and includes pump means for controllably introducing and ejecting water from a ballast chamber in relation to the vertical velocity of the structure; control means including velocity sensing means for sensing the vertical velocity of the structure; ballast sensing means for sensing the volume of water in each ballast chamber relative to a mean volume of water therein; and a control loop responsive to the velocity sensing means and to the ballast sensing means for controlling the pump means to vary the actual volume of water in each ballast chamber relative to the mean volume of water therein as a function of the sensed vertical velocity.

15. A semi-submersible floating structure comprising:
deck means;
a plurality of main columns attached to and extending below said deck means for submersion in water to provide buoyant supporting force for the structure;
pontoon means attached to said main columns near the lower ends thereof that are adapted to be submerged, said pontoon means having an upper horizontal surface projection which is positioned to remain submerged; and
damping means attached to the structure for exerting damping force thereon substantially in opposition to and as a function of the vertical velocity of the structure attributable to wave motion acting on the plurality of columns and pontoon means, said damping means includes ballast chambers in selected ones of the columns and pontoon means, and includes pump means for controllably introducing and ejecting water from a ballast chamber in relation to the vertical velocity of the structure, and for each ballast chamber a control means including first and second presurized air chambers, a first conduit for connecting the first air chamber to the ballast chamber, and a second conduit for connecting the second air chamber to the ballast chamber; the pump means includes a pump connected for pumping air from the first air chamber to the second air chamber to maintain a pressure difference in the first and second air chambers, a first valve included in the first conduit, and a second valve included in the second conduit; and a control loop including a velocity sensing means and a ballast sensing means for controlling the first and second valves to vary the air pressure in the ballast chamber to vary the actual volume of water in the ballast chamber relative to the mean volume of water therein as a function of the sensed vertical velocity.

16. Method of reducing heave of a semi-submersible floating structure having a plurality of columns that extend below a deck to provide buoyant supporting force for the structure and having attached to the columns near submerged ends thereof pontoon means which have horizontal surface projections that remain submerged, the method comprising:
sensing the rate of change of one component of undesirable displacement of the structure;
exerting damping force on the structure substantially in opposition in relation to and as a function of the sensed rate of change attributable to wave motion acting on the columns and pontoon means; and
sensing the quantity of water contained in a ballast chamber; and wherein
the step of exerting damping force is performed in relation to the rate of change of said one component of undesirable displacement of the structure in selected combination with the difference between a predetermined quantity of water and the actual quantity of water contained within a ballast chamber.

* * * * *